United States Patent [19]

Hirschkoff et al.

[11] 4,141,143
[45] Feb. 27, 1979

[54] CHAIN SAW HANDLE AND VIBRATION ISOLATION SYSTEM

[75] Inventors: Sidney Hirschkoff, Los Angeles; Douglas A. Milliken, Thousand Oaks, both of Calif.

[73] Assignee: McCulloch Corporation, Los Angeles, Calif.

[21] Appl. No.: 845,585

[22] Filed: Oct. 26, 1977

[51] Int. Cl.² ............................ B27B 17/02; F16F 1/36
[52] U.S. Cl. ................................................ 30/381
[58] Field of Search ................. 30/381, 382, 383, 384, 30/385

[56] References Cited

U.S. PATENT DOCUMENTS

| | | | |
|---|---|---|---|
| 3,409,056 | 11/1968 | Rauh | 30/381 |
| 3,813,776 | 6/1974 | Frederickson | 30/381 |
| 3,945,119 | 3/1976 | Nagashima | 30/383 |
| 3,972,119 | 8/1976 | Bailey | 30/381 |
| 4,041,606 | 8/1977 | Thompson | 30/381 |

*Primary Examiner*—Jimmy C. Peters
*Attorney, Agent, or Firm*—Kenway & Jenney

[57] ABSTRACT

A chain saw including an improved suspension system characterized by a U-shaped hand grip means extending transversely across a longitudinal median plane of a guide bar means, with the U-shaped hand grip means being contiguous with a longitudinally extending rear handle and serving to house, at least in part, a portion of the chain saw vibration isolation system.

Generally longitudinally aligned vibration isolation units are constrained by abutment means and axially oppositely directed mounted shaft means to impede axially oppositely directed movements of a vibration generating assembly relative to the chain saw suspension system.

7 Claims, 5 Drawing Figures

CHAIN SAW HANDLE AND VIBRATION ISOLATION SYSTEM

GENERAL BACKGROUND AND SUMMARY OF INVENTION

Although substantial efforts have been made in the chain saw art to develop integrated handle and vibration isolation systems for the purpose of reducing operator fatigue, the effort to optimize the reduction of chain saw vibration, while facilitating overall handling and control, has been continuing in nature.

Substantial advances in the vibration isolation art have been effected through contributions by the assignee of the present invention, as evidenced by the following U.S. Pat. Nos.:

| Frederickson et al | 3,542,095 | (November 24, 1970) |
|---|---|---|
| Frederickson et al | 3,652,074 | (March 28, 1972) |
| Frederickson et al | 3,698,455 | (October 17, 1972) |
| Frederickson et al | 3,813,776 | (June 4, 1974) |
| Bailey | 3,845,557 | (November 5, 1974) |
| Bailey | 3,911,580 | (October 14, 1975) |
| Bailey | 3,972,119 | (August 3, 1976) |
| Thompson | 4,041,606 | (August 16, 1977) |

Other efforts in the chain saw vibration isolation art, as provided by other practisioners, are generally evidenced by the following U.S. Pat. Nos.:

| La Force | 3,140,746 | (July 14, 1964) |
|---|---|---|
| Dobbertin et al | 3,224,473 | (December 21, 1965) |
| Irgens | 3,372,718 | (March 12, 1968) |
| Rauh | 3,409,056 | (November 5, 1968) |
| Kobayashi | 3,525,372 | (August 25, 1970) |
| Scharpf | 3,530,909 | (September 29, 1970) |
| Sherwood, Jr. et al | 3,637,029 | (January 25, 1972) |
| Stihl et al | 3,651,839 | (March 18, 1972) |
| Emmerich et al | 3,680,608 | (August 1, 1972) |
| Kobayashi et al | 3,700,015 | (October 24, 1972) |
| Makinson et al | 3,728,793 | (April 24, 1973) |
| Notaras et al | 3,733,700 | (May 22, 1973) |
| Heermann | 3,772,784 | (November 20, 1973) |
| Schulin | 3,845,827 | (November 5, 1974) |
| Kolorz | 3,849,883 | (November 26, 1974) |
| Dillon | 3,889,763 | (June 17, 1975) |
| Nagashima et al | 3,945,119 | (March 23, 1976) |

Although the foregoing listing of patents is believed to provide a generally reasonable assessment of prior art efforts, it is to be recognized that the compilation set forth above does not constitute a complete delineation of each and every prior art effort in the vibration isolation art.

The present invention is directed toward a furtherance of the continuing efforts to improve chain saw handling characteristics by uniquely integrating a housing arrangement for vibration isolating means with a particular efficaciously arranged front hand grip. This front hand grip constitutes a generally U-shaped hand grip portion which is incorporated in a front handle of a chain saw and extends transversely across a longitudinal median plane of a guide bar. The U-shaped hand grip portion uniquely cooperates with a forward portion of a rear handle so as to define a mounting for a vibration isolation unit.

The unitized, i.e., interconnected, front and rear handles of the handle assembly of the invention are mounted on oppositely axially directed mounting shafts and cooperate with axially oppositely directed abutment means so as to affirmatively impede axially oppositely directed movements of the vibration generating assembly of the chain saw relative to the handle suspension system.

A typical chain saw with which the present improved suspension system is incorporated comprises a vibration generating assembly including engine means, with guide bar means extending generally longitudinally from one side portion of the chain saw and having a longitudinal median plane and a longitudinal median axes. In the upright cutting configuration of the chain saw, the longitudinal median plane would be generally vertically oriented, with the longitudinal median axis extending in the longitudinal median plane, generally horizontally.

The vibration generating assembly would further typically include cutter chain means mounted on the periphery of the guide bar means for movement thereabout, with drive means being operable to drivingly couple the engine means with the cutter chain means.

Basic aspects of the suspension system, improved through the present invention, include means operable to yieldably support the vibration generating assembly and comprising a handle assembly and vibration isolating means. The handle assembly would typically include a front handle and a rear handle both having a hand grip portion. The vibration isolating means would serve to interconnect the handle assembly and the vibration generating assembly.

The improvement in the suspension system, afforded through the present invention, comprises first and second axially oppositely directed mounting shaft means located on one side of the longitudinal median plane of the guide bar means. These mounting shaft means are operable to provide force transmission between the vibration generating assembly and the suspension system and are oriented with their longitudinal axis extending generally longitudinally of the longitudinal median plane of the guide bar means.

A first cushioning means, included in the vibration isolating means, may comprise first, resilient diaphragm means having a first aperture extending generally transversely of the longitudinal median plane of the guide bar means. The first mounting shaft means passes through a first aperture of this first diaphragm means, with the first diaphragm means being mounted upon the first mounting shaft means. A first resilient impedance means, mounted on the first mounting shaft means, engages one side of the first diaphragm means. A second resilient impedance means, mounted on the first mounting shaft means, engages an opposite sides of the first diaphragm means. Mounting means interconnect the first diaphragm means, in a vibration isolating condition, between the vibration generating assembly and the suspension system.

Second cushioning means are also included in the vibration isolating means and may comprise second, resilient diaphragm means having a second aperture extending generally transversely of the longitudinal median plane of the guide bar means. The second mounting shaft means passes through a second aperture of the second diaphragm means, with the second diaphragm means being mounted upon the second mounting shaft means. A third resilient impedance means is mounted on the second mounting shaft means and engages one side of the second diaphragm means. A fourth resilient impedance means is mounted on the second mounting shaft means and engages in opposite side of the second diaphragm means.

Another mounting means connects the second mounting shaft means in a vibration isolating condition between the vibration generating assembly and the suspension system.

A unique U-shaped hand grip means, included in the improved suspension system, extends transversely of the longitudinal median plane of the guide bar means and is provided with a pair of leg portions extending above the engine means.

One of these leg portions extends from a forward end of the rear handle, generally transversely across the longitudinal median plane of the guide bar means. The other of the leg portions is spaced generally above the one leg portion, with a generally upright connecting portion serving to interconnect the one and other leg portions.

The U-shaped hand grip means extends transversely across the longitudinal median plane of the guide bar means and is located generally above the vibration generating assembly.

Another independently significant aspect of the invention resides in that portion of the improved suspension system noted above which is characterized by the unique U-shaped hand grip means incorporated in the front handle, as above noted, and which intersects the longitudinal median plane of the guide bar means, above the engine means. This arrangement provides a front hand grip portion directly in front of, but located above, the rear hand grip portion of the integrated handle assembly. In this structure, a vibration isolating or "cushioning" means serves to interconnect the U-shaped hand grip portion and the vibration generating assembly of the chain saw.

Other aspects of the invention which are deemed to be significant, either individually or collectively, in the context of either of the basic aspects of the invention noted above should also be considered.

One such combination aspect pertains to a chain saw, as above described, wherein each of the first and second axially oppositely directed mounting shafts have a longitudinal shaft axis, with the longitudinal axes of the first and second mounting shafts being mutually parallel and coplanar.

In this arrangement, the first and second axially oppositely directed mounting shafts are mounted, respectively, on first and second, suspension system restraining, abutment means. The first and second suspension system restraining abutment means are carried by the vibration generating assembly and are operable to limit longitudinal movement of the handle assembly in opposite directions, longitudinally of the chain saw.

Another combination concept resides in a chain saw as above described wherein the rear handle includes rear handle end means facing the front handle and the front handle includes front handle end means facing the rear handle end means. Recess means, carried by at least one of the front and rear handle end means serves to house and restrain at least a portion of a vibration isolating or "cushioning" unit.

In describing the invention, reference will be made to appended drawings which illustrate, by way of example but not by way of limitation, a presently preferred embodiment of the invention.

DRAWINGS

The presently preferred embodiment of the invention is illustrated in the accompanying drawings.

As shown in these drawings:

FIG. 1 provides a side elevational view of a chain saw, depicted in a generally upright configuration, and illustrating suspension system protions of the chain saw in solid line, with the vibration generating assembly portion of the chain saw being shown in phantom line for purposes of overall clarity in relation to the presentation and discussion of the present invention;

FIG. 2 provides a top plan view of the FIG. 1 assembly;

FIG. 3 provides a front elevational view of the FIG. 2 assembly, with the mounting web for the rear vibration shaft omitted for clarity of illustration;

FIG. 4 provides an enlarged fragmentary, transverse, sectional view of a rearwardly located vibration isolation unit, as viewed generally along the section line 4—4 of FIG. 2; and FIG. 5 provides an enlarged, fragmentary, transverse, sectional view of a generally forwardly located vibration isolation unit, as viewed generally along section line 5—5 of FIG. 2.

DETAILED DESCRIPTION OF PREFERRED EMBODIMENT

The ensuing discussion of the preferred embodiment will proceed in two stages.

In the first stage, the context or "setting" of the invention will be briefly reviewed with respect to conventional structural characteristics of a chain saw.

Following the discussion of the "setting" or context of the invention, a detailed discussion will be presented in relation to specific aspects of the improved suspension system of the present invention.

Context of Invention

Figure 1:
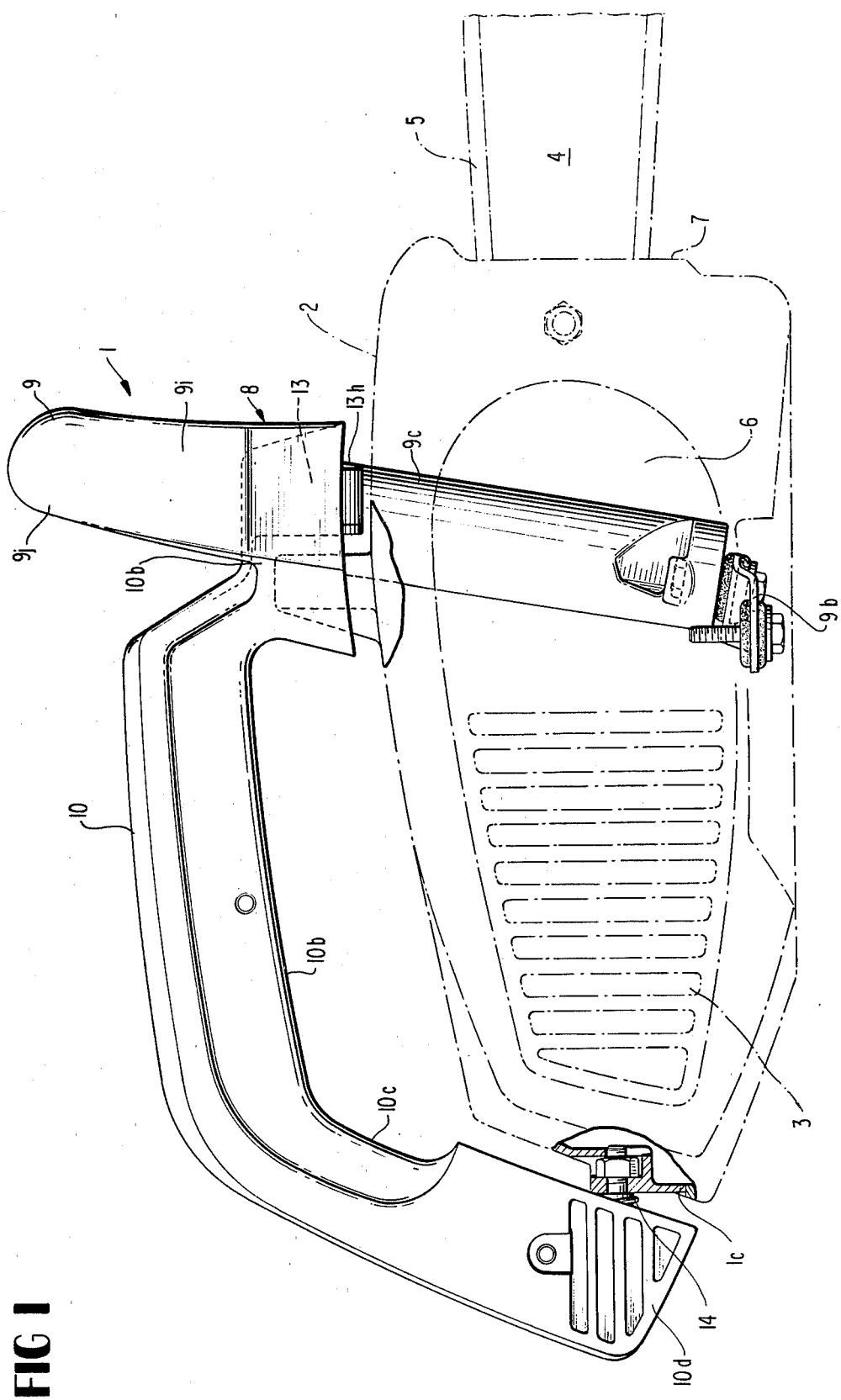
Figure 2:
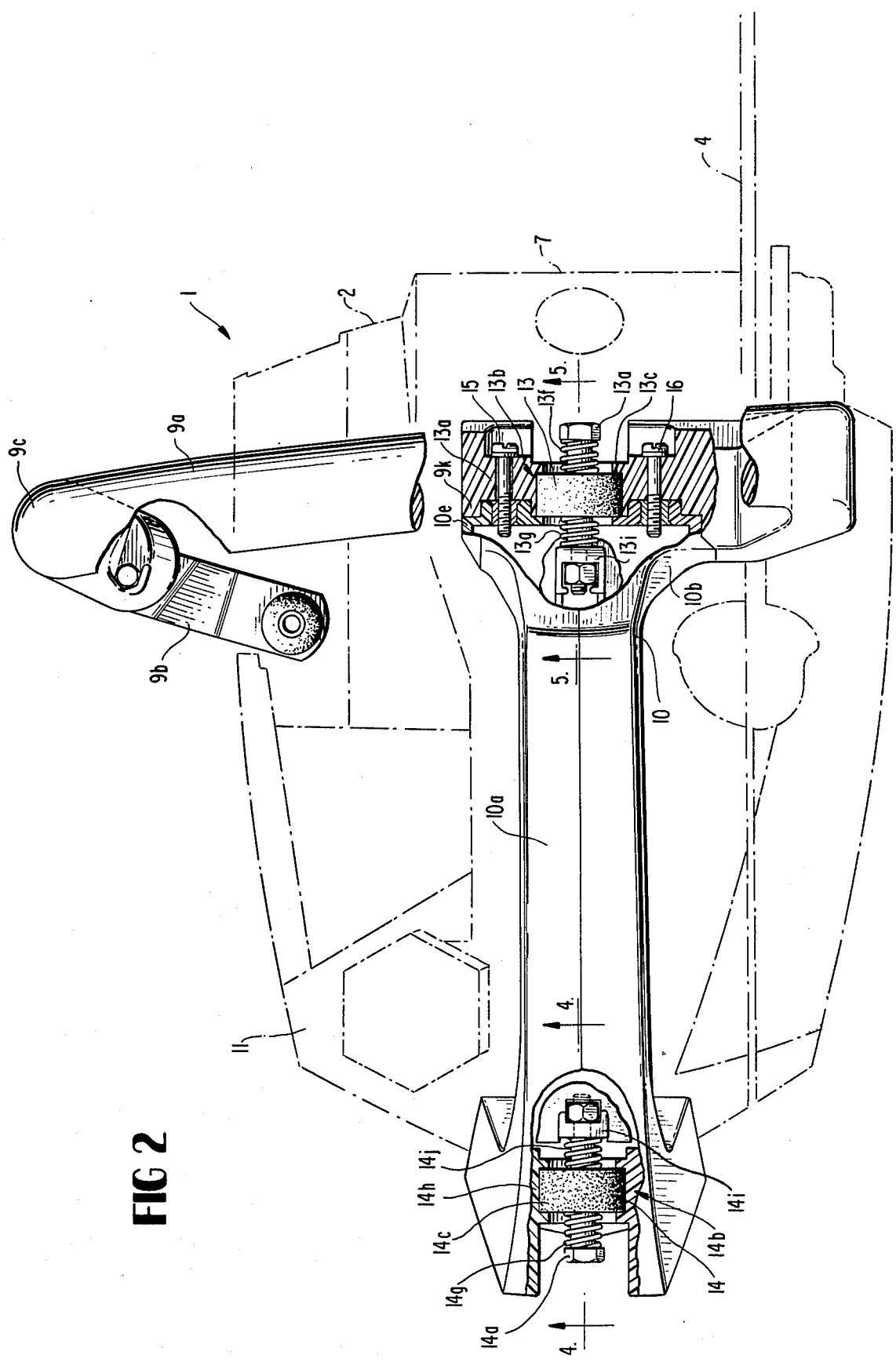
Figure 3:
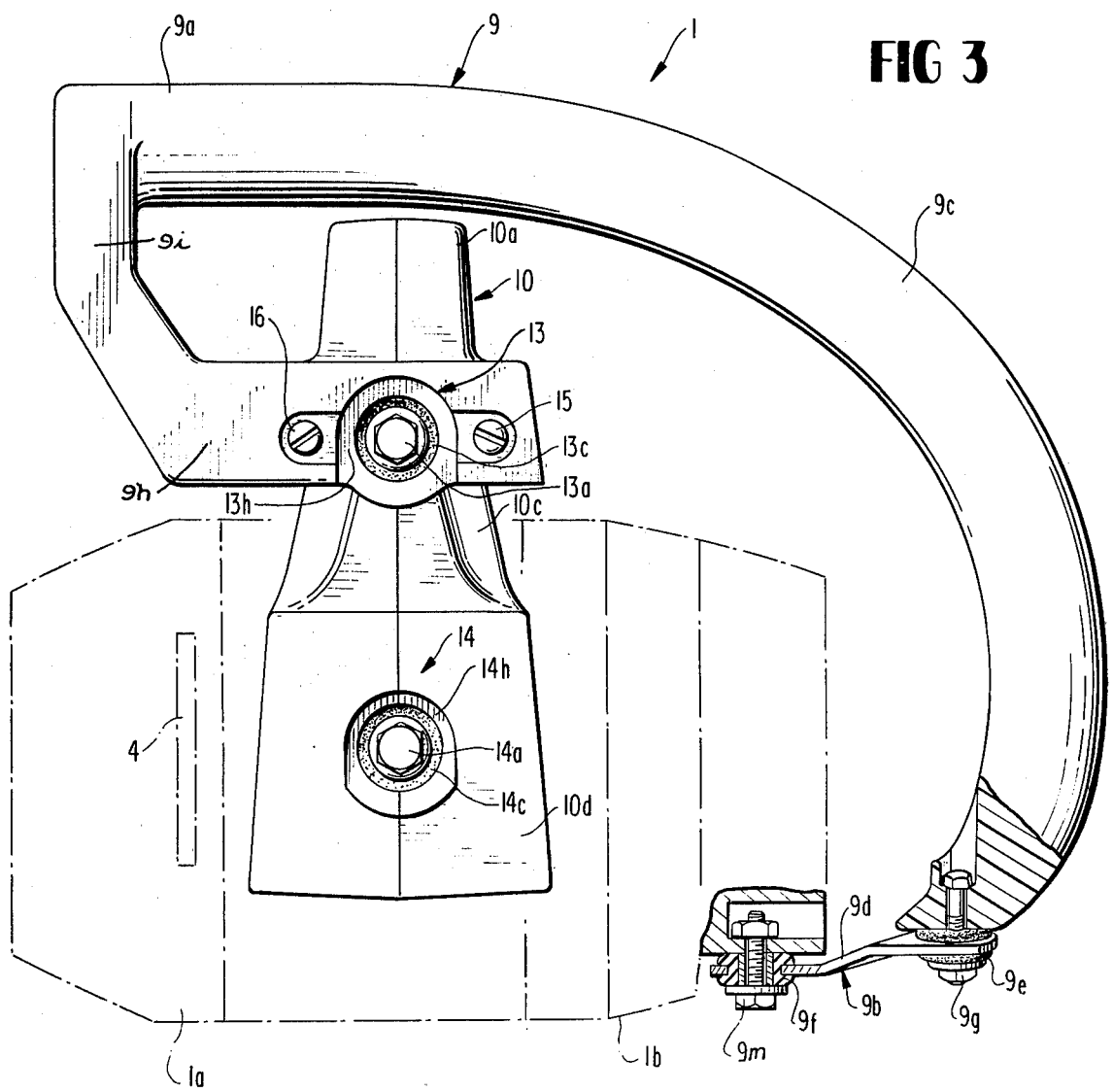

As depicted in FIGS. 1, 2 and 3, chain saw 1 comprises a vibration generating assembly 2 which includes an engine assembly 3 and guide bar 4, extending generally longitudinally of the right side portion 1a of the chain saw as depicted in FIG. 2. A schematically illustrated, cutter chain 5 is mounted on the peripheral edge of the guide bar 4 fur cutting movement about the periphery of the guide bar 4.

Guide bar 4, in the illustrated upright position, includes an upright, longitudinal median plane and a generally horizontal longitudinal median axis included in this plane.

A locationally illustrated drive means 6 (usually of the centrifugal clutch type) is provided to drivingly couple the engine means with the cutter chain 5 at the forward end 7 of the chain saw.

Chain saw 1 may include a safety brake actuating handle means 7, not shown, in front of a main handle assembly 8.

Handle assembly 8 may include a front handle 9 comprising a generally horizontally extending top leg portion 9a extending across the top of the chain saw, a lower generally horizontally connecting strut 9b extending from the under side of the chain saw, and an upright leg 9c interconnecting upper and lower portions 9a and 9b.

Link 9b, as shown, may comprise a web-like strut 9d supporting shock absorbing, resilient, elastomeric grommets 9e and 9f. Threaded fasteners 9g and 9m may serve to connect the grommetted ends of link 9b with the lower portion of handle portion 9c and the underside of side 1b of chain saw 1.

Handle assembly 8 may further include a rear handle 10 as depicted in FIGS. 1, 2 and 3.

Rear handle 10 includes a rear hand-grip portion 10a, located over engine means 3, which extends between a front end portion 10b and a downwardly extending, rearmost portion 10c.

Although not illustrated, hand grip portion 10a would conventionally carry starting and control features such as a throttle trigger.

As shown in phantom line FIG. 2, chain saw 1 may include a gas tank 11 with an associated gas filling cap 12 and may further include a "pull-type" starter cord means terminating in a pull handle on the top of the chain saw.

Front handle 9 and rear handle 10 are joined or "integrated" at a "T" juncture 8a. At this juncture, a generally horizontal, lower leg portion 9h extends from the front end 10b of rear handle 10 to an upright handle portion 9i. Handle portion 9i cooperates with upper and lower leg portions 9a and 9h to define a U-shaped, front hand grip 9j. This front hand grip 9j extends transversely of, and passes across, the longitudinal median plane of the guide bar.

Figure 4:
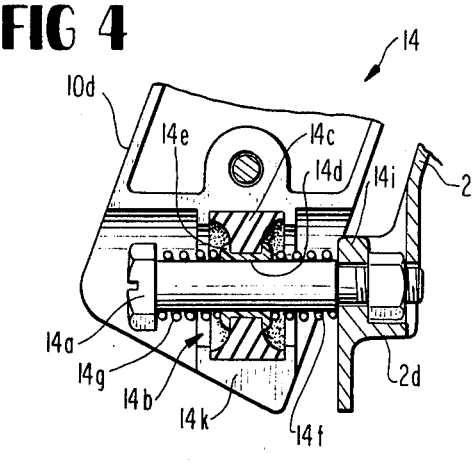
Figure 5:
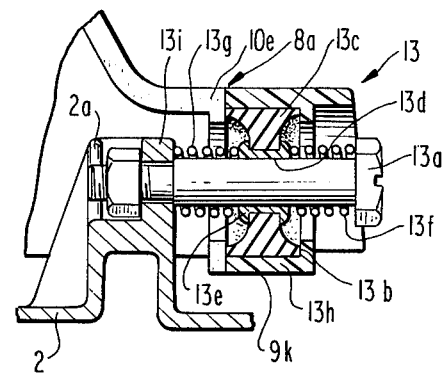

Chain saw 1 further includes front and rear, cushioning or vibration isolating units 13 and 14, as shown in FIGS. 2, 4 and 5. Front unit 13 interconnects "T" junction 8a with the vibration generating assembly 2 while rear unit 14 interconnects the lower terminus 10d or rear handle portion 10c with the lower, rear portion 1c of chain saw 1, as shown in FIG. 1.

Handle assembly 8, and vibration isolating means 13 and 14, cooperate to provide a vibration isolating suspension system, operable to yieldably support the vibration generating assembly 2.

With the basic context of the invention having been set forth, discussion is now in order in relation to the improved suspension system of the present invention.

Improved Suspension System of the Preferred Embodiment

As shown in FIGS. 1–3, the units 13 and 14 include first and second, axially oppositely directed, mounting shaft means 13a and 14a, respectively located on the left side of the longitudinal median plane of the guide bar 4. These shafts 13a and 14a are carried by the vibration generating assembly 2, and are oriented with their longitudinal axes extending generally longitudinally of the longitudinal median plane of the guide bar 4.

The first mounting shaft means 13a as shown in FIG. 5, is threadably connected with an upper, front portion 2a of the vibration generating assembly 2 and is oriented so as to extend generally longitudinally of the longitudinal median axis of the guide bar 4. As shown, shaft 13a is disposed generally above the engine means 3. In addition, shaft 13a is connected with the vibration generating assembly 2 so as to project generally away from said rear hand grip portion 10a of rear handle 10, generally toward the guide bar end 7 of the chain saw 1.

The second mounting shaft means 14a, as shown in FIG. 4, is connected with a rear, lower portion 2b of the vibration generating assembly, 2 and is oriented with its longitudinal axis extending generally longitudinally of the longitudinal median axis of the guide bar 4.

Shaft 14a is located generally rearwardly of the engine means 3 and is connected with the vibration generating assembly 2 so as to project generally rearwardly of the chain saw 1, away from the engine means 3.

A first cushioning means 13b is included in the vibration isolating means and comprises a first, resilient, elastomeric, annular diaphragm means 13c having a first aperture 13d extending generally transversely of the longitudinal median plane of the guide bar 4. Aperture 13d may be defined by a nylon bushing 13e slidably mounted on shaft 13a and providing a hub portion of the diaphragm 13c.

The first mounting shaft means 13a passes through the first aperture 13d of the first diaphragm means 13c, with the first diaphragm means 13c being slidably journaled upon the first mounting shaft means 13a.

A first resilient impedance means, i.e. coil spring 13f, is mounted on the first mounting shaft means 13a and abuttingly and separably engages one side of the nylon bushing 13e of the first diaphragm means 13c. In addition a second resilient impedance means, i.e. coil spring 13g, is mounted on the first mounting shaft means 13a and abuttingly and separably engages the opposite side of nylon bushing 13e of the first diaphragm means 13c.

An annular socket 13h, defined by "T" juncture 8a, provides first mounting means, connecting the first diaphragm means 13c with the handle assembly 8. As shown in FIG. 5, the outer periphery of diaphragm means 13c is snugly received within annular socket 13h.

A mounting web 13i, defined by a wall portion of portion 2a of assembly 2 provides a second mounting means, connecting the first mounting shaft means 13a with the vibration generating assembly 2. As shown in FIG. 5, shaft 13a passes through an aperture of web 13i and is secured thereto by a shaft shoulder and securing nut.

A second cushioning means 14b is included in the vibration isolating means and comprises a second resilient elastomeric, annular diaphragm means 14c having a second aperture 14d, extending generally transversely of the longitudinal median plane of the guide bar means 4. Aperture 14d may be defined by a nylon bushing 14e, slideably mounted on shaft 14a, and providing a hub portion of the diaphragm 14c.

The second mounting shaft means 14d passes through the second aperture 14d of the second diaphragm means 14c, with the second diaphragm means 14c being slideably journaled upon the second mounting shaft means 14a.

A third resilient impedance, i.e. coil spring 14f, is mounted on the second mounting shaft means 14a and abuttingly and separably engages one side of the nylon bushing 14e of the second diaphragm means 14c. In addition, a fourth resilient impedance means, i.e. coil spring 14g, is mounted on the second mounting shaft means 14a and abuttingly and separably engages an opposite side of nylon bushing 14e of the second diaphragm means 14c.

An annular socket 14h, defined by transversely separable portions of handle portion 10d, provides third mounting means connecting the second diaphragm means 14c with the handle assembly 8. As shown in FIG. 4, the outer periphery of diaphragm means 14c is snugly received within annular socket 14h.

A mounting web 14i, defined by a wall portion of portion 2b of assembly 2, provides a fourth mounting means, connecting the second mounting shaft means 14a with the vibration generating assembly 2. As shown in FIG. 4, shaft 14a passes through an aperture of web 14i and is secured thereto by a shaft shoulder and securing nut.

The aforementioned diaphragm means 13c and 14c may be configured as shown, or as illustrated, for example, in the earlier noted Frederickson et al U.S. Pat. No. 3,813,776, Bailey U.S. Pat. No. 3,911,580, and/or Bailey U.S. Pat. No. 3,972,119. In any event, it is believed that the cushioning arrangements shown embody and implement the inventive, generic concept set forth in the above noted Frederickson et al U.S. Pat. No. 3,813,776.

As earlier noted, the U-shaped hand grip means 9j extends transversely of the longitudinal median plane of the guide bar means and has a pair of leg portions 9h and 9a extending above the engine means 3. This U-shaped hand grip means, although earlier described in connection with the "Context of the Invention" for purposes of clarity of presentation, is believed to uniquely cooperate with vibration isolating means so as to afford, a particularly effective combination of operator control and reduction in vibrations transmitted to the operator's hands.

One of the leg portions 9h extends from the forward end 10b of the rear handle 10, generally transversely of the longitudinal median plane of the guide bar means 4. The other of the leg portions 9a is spaced generally above the one leg portion 9h and the generally upright connecting portion 9i interconnects the one and other leg portions 9h and 9a.

This U-shaped hand grip means 9j extends transversely across the longitudinal median plane of the guide bar means 4, as shown, and is located generally above the vibration generating assembly 2. In addition, it defines a front hand grip portion 9a disposed above and directly forward of the rear hand group portion 10a.

As noted, vibration isolating means 13 interconnects the U-shaped hand grip means 9j and the vibration generating assembly 2.

Furthermore, the vibration isolating linkage means 9b, connected with the front handle 9, provides a vibration isolation connection between an underside forward portion of the chain saw 1 and the U-shaped hand grip means 9j, via front handle portion 9c.

As shown in FIGS. 3 and 5, rear handle 10 includes apertured rear handle end face means 10e facing the front handle 9. Similarly, the front handle 9 includes apertured front handle end face means 9k facing the rear handle end face means 10e.

In addition, the handle assembly 8 includes recess means 8b carried by at least one of the front and rear handle end face means and snugly housing and restraining the first, resilient diaphragm means 13c. This recess means, as illustrated is provided by an opening of circular cross section extending forwardly of end face means 9k to an annular ledge 91 in handle portion 9h.

The front and rear end face means 9k and 10e are mutually abutting, as shown, and cooperate with the recess means 8b to define the mounting means 13h which is operable to house, at least in part, the vibration isolating means 13.

As was earlier noted, the vibration isolating means 13, interconnecting the U-shaped hand grip means 9j and the vibration generating assembly 2, is mounted at least partially within the mounting means 13h. In addition, it is to be noted that the mounting means 13h is at least partially included in the lower leg portion 9h of the U-shaped hand grip means 9j in the preferred and illustrated embodiment.

With respect to mounting shafts 13a and 14a, they are preferably arranged so as to be axially oppositely directed, as shown. Desirably, the longitudinal shaft of the first and second mounting shafts 13a and 14a are mutually parallel, coplanar, and parallel to the longitudinal median plane of the guide bar.

Further, the first and second axially oppositely directed mounting shafts 13a and 14a are mounted, respectively, on first and second suspension system restraining abutment means defined by mounting webs 13i and 14i, respctively. These first and second, suspension system restraining abutment means 13i and 14i are carried by the vibration generating assembly 2 and are operable to limit longitudinal movement of said handle assembly 8 in opposite directions, longitudinally of the chain saw, without impeding the vibration isolating action of units 13 and 14. This arrangement tends to insure retention of the assembly 2 on the handle assembly 8, even in the event of a whole or partial diaphragm failure.

In conclusion, and with reference to FIG. 2 and FIG. 3, it will be appreciated that front handle 9 may be connected with rear handle 10 by way of threaded fastener means 15 and 16, passing through end face means 9k and 10e.

SUMMARY OF MAJOR ADVANTAGES, UNOBVIOUSNESS AND SCOPE OF INVENTION

The manner in which the U-shaped hand grip means of the present invention cooperates with the overall handle assembly to provide a front hand grip, (1) intersecting the longitudinal median plane of the guide bar means, (2) aligned directly forward of the rear hand grip area, and (3) superposed over the engine/drive means of the vibration generating assembly is believed to afford particularly effective and balanced operator control in conjunction with vibration isolation.

In addition, by incorporating a vibration isolating unit at the interface between the front and the rear hand grip areas, it is believed that effective vibration isolation is able to be achieved in relation to each of the rear and front hand grip areas.

The axially oppositely directed mounting shafts for the front and rear vibration isolation units, in combination with the front and rear restraining abutment means, serve to provide a unique safety feature. Front and rear movements of the vibration isolation system, in axially opposite directions are affirmatively restrained while permitting the usual vibration isolation movements both forwardly and rearwardly in longitudinal directions.

In the context of the overall invention, it is believed that the shaft mounted, vibration isolating diaphragm systems serve to afford particular advantages, implementing the invention of the above noted United States Frederickson U.S. Pat. No. 3,813,776.

While the prior art patents depicted at the outset of the disclosure indicate a variety of approaches to integrated vibration isolation and handle systems, these prior art disclosures do not provide any suggestion or direction in the art leading to the concepts presently claimed, along with their attendant advantages and functional significance. Accordingly, it is to be concluded that the prior art, in not suggesting or pointing toward the presently presented invention, evidences the unobviousness of the invention.

With respect to the manner in which the invention may be practiced, it will be recognized that substantial modifications in arrangement and selection of components may be accommodated.

For example, vibration isolation units other than those specifically disclosed might be employed and variations should be contemplated in relation to specific configurations of the handle assembly.

In short, those skilled in the chain saw art and familiar with the present disclosure may well be envision additions, deletions, substitutions, equivalents, and other modifications which would fall within the purview of the invention as claimed.

The embodiments of the invention in which an exclusive property or privilege is claimed are defined as follows:

1. In a chain saw comprising
a vibration generating assembly including
engine means,
guide bar means extending generally longitudinally from one side portion of said chain saw and having a longitudinal median plane and a longitudinal median axis,
cutter chain means mounted on the periphery of said guide bar means for movement thereabout, and,
drive means operable to drivingly couple said engine means to said cutter chain means; and
a suspension system operable to yieldably support said vibration generating assembly and including
a handle assembly including
a front handle, and
a rear handle having a rear hand grip portion, and
vibration isolating means interconnecting said handle assembly and said vibration generating assembly;
the improvement in said suspension system comprising:
first and second axially oppositely directed mounting shaft means located on one side of said longitudinal median plane of said guide bar means, operable to provide force transmission between said vibration generating assembly, and said suspension system and oriented with their longitudinal axes extending generally longitudinally of said longitudinal median plane of said guide bar means;
first cushioning means included in said vibration isolating means and comprising
first resilient diaphragm means having a first aperture and extending generally transversely of said longitudinal median plane of said guide bar means,
said first mounting shaft means passing through said first aperture of said first diaphragm means, with said first diaphragm means being mounted upon said first mounting shaft means,
first resilient impedance means mounted on said first mounting shaft means and engaging one side of said first diaphragm means,
second resilient impedance means mounted on said first mounting shaft means and engaging an opposite side of first diaphragm means,
front mounting means connecting said first diaphragm means in a vibration isolating condition between said vibration generating assembly and said suspension system;
second cushioning means included in said vibration isolating means and comprising
second resilient diaphragm means having a second aperture and extending generally transversely of said longitudinal median plane of said guide bar means,
said second mounting shaft means passing through said second aperture of said second diaphragm means, with said second diaphragm means being mounted upon said second mounting shaft means,
third resilient impedance means mounted on said second mounting shaft means and engaging one side of said second diaphragm means,
fourth resilient impedance means mounted on said second mounting shaft means and engaging an opposite side of second diaphragm means,
rear mounting means connecting said second mounting shaft means in a vibration isolating condition between said vibration generating assembly and said suspension system; and
U-shaped hand grip means extending transversely of said longitudinal median plane of said guide bar means and having a pair of leg portions extending above said engine means,
one of said leg portions extending from a forward end of said rear handle, generally transversely of said longitudinal median plane of said guide bar means,
the other of said leg portions being spaced generally above said one leg portion, and
a generally upright connecting portion interconnecting said one and other leg portions;
said U-shaped hand grip means extending transversely across said longitudinal median plane of said guide bar means and being located generally above said vibration generating assembly.

2. In a chain saw comprising
a vibration generating assembly including
engine means,
guide bar means extending generally longitudinally from one side portion of said chain saw and having a longitudinal median plane and a longitudinal median axis,
cutter chain means mounted on the periphery of said guide bar means for movement thereabout, and,
drive means operable to drivingly couple said engine means to said cutter chain means; and
a suspension system operable to yieldably support said vibration generating assembly and including
a handle assembly including
a front handle, and
a rear handle having a rear hand grip portion, and
vibration isolating means interconnecting said handle assembly and said vibration generating assembly;
the improvement in said suspension system comprising:
first and second axially oppositely directed mounting shaft means located on one side of said longitudinal median plane of said guide bar means, carried by said vibration generating assembly, and oriented with their longitudinal axis extending generally longitudinally of said longitudinal median plane of said guide bar means;
said first mounting shaft means
being connected with an upper, front portion of said vibration generating assembly,
being oriented so as to extend generally longitudinally of said longitudinal median axis of said guide bar means,
being disposed generally above said engine means, and being connected with said vibration generating assembly and projecting generally away from said rear hand grip portion of said rear handle, generally toward the guide bar end of said chain saw;

said second mounting shaft means
being connected with a rear portion of said vibration generating assembly,
being oriented with its longitudinal axis extending generally longitudinally of said longitudinal median axis of said guide bar means,
being located generally rearwardly of said engine means, and
being connected with said vibration generating assembly and projecting generally rearwardly of said chain saw, away from said engine means;

first cushioning means included in said vibration isolating means and comprising
first resilient diaphragm means having a first aperture and extending generally transversely of said longitudinal median plane of said guide bar means,
said first mounting shaft means passing through said first aperture of said first diaphragm means, with said first diaphragm means being slidably journaled upon said first mounting shaft means,
first resilient impedance means mounted on said first mounting shaft means and abuttingly and separably engaging one side of said first diaphragm means,
second resilient impedance means mounted on said first mounting shaft means and abuttingly and separably engaging an opposite side of first diaphragm means,
first mounting means connecting said first diaphragm means with said handle assembly, and
second mounting means connecting said first mounting shaft means with said vibration generating assembly;

second cushioning means included in said vibration isolating means and comprising
second resilient diaphragm means having a second aperture and extending generally transversely of said longitudinal median plane of said guide bar means,
said second mounting shaft means passing through said second aperture of said second diaphragm means, with said second diaphragm means being slidably journaled upon said second mounting shaft means,
third resilient impedance means mounted on said second mounting shaft means and abuttingly and separably engaging one side of said second diaphragm means,
fourth resilient impedance means mounted on said second mounting shaft means and abuttingly and separably engaging an opposite side of second diaphragm means,
third mounting means connecting said second diaphragm means with said handle assembly, and
fourth mounting means connecting said second mounting shaft means with said vibration generating assembly;

U-shaped hand grip means extending transversely of said longitudinal median plane of said guide bar means and having a pair of leg portions extending above said engine means,
one of said leg portions extending from a forward end of said rear handle, generally transversely of said longitudinal median plane of said guide bar means,
the other of said leg portions being spaced generally above said one leg portion, and
a generally upright connecting portion interconnecting said one and other leg portions and disposed on a side of said guide bar means longitudinal median plane opposite to the side of said guide bar means longitudinal median plane where said first and second mounting shaft means are located;
said U-shaped hand grip means extending transversely across said longitudinal median plane of said guide bar means and being located generally above said vibration generating assembly; and
vibration isolating linkage means connected with said front handle and providing a vibration isolation connection between an underside portion of said chain saw and said U-shaped hand grip means.

3. A chain saw as described in claim 2 wherein;
each of said first and second, axially oppositely directed mounting shafts has a longitudinal shaft axis,
said longitudinal axes of said first and second mounting shafts being mutually parallel and coplanar; and
said first and second, axially oppositely directed mounting shafts are mounted, respectively, on first and second suspension system restraining abutment means,
said first and second, suspension system restraining abutment means being carried by said vibration generating assembly and being operable to limit longitudinal movement of said handle assembly in opposite directions, longitudinally of said chain saw.

4. A chain saw as described in claim 2 wherein:
said rear handle includes
rear handle end means facing said front handle;
said front handle includes
front handle end means facing said rear handle end means;
said handle assembly includes recess means carried by at least one of said front and rear handle end means and housing said first, resilient diaphragm means;
said front and rear end means being mutually abutting and cooperating with said recess means to define said first mounting means.

5. A chain saw as described in claim 2 wherein:
each of said first and second, axially oppositely directed mounting shafts has a longitudinal shaft axis,
said longitudinal axes of said first and second mounting shafts being mutually parallel and coplanar;
said first and second, axially oppositely directed mounting shafts are mounted, respectively, on first and second suspension system restraining abutment means,
said first and second, suspension system restraining abutment means being carried by said vibration generating assembly and being operable to limit longitudinal movement of said handle assembly in opposite directions, longitudinally of said chain saw;

said rear handle includes
  rear handle end means facing said front handle;
said front handle includes
  front handle end means facing said rear handle end means;
said handle assembly includes recess means carried by at least one of said front and rear handle end means and housing said first, resilient diaphragm means;
said front and rear end means being mutually abutting and cooperating with said recess means to define said first mounting means.

6. In a chain saw comprising
a vibration generating assembly including
  engine means,
    guide bar means extending generally longitudinally from one side portion of said chain saw and having a longitudinal median plane,
    cutter chain means mounted on the periphery of said guide bar means for movement thereabout, and
    drive means operable to drivingly couple said engine means to said cutter chain means; and
a suspension system operable to support said vibration generating assembly and including
  a handle assembly including
    a front handle, and
    a rear handle having a rear hand grip portion;
the improvement in said suspension system comprising:
  U-shaped hand grip means extending transversely of said longitudinal median plane of said guide bar means and having a pair of horizontal leg portions and a generally upright connecting portion extending above said engine means,
    one of said leg portions extending horizontally from a forward end of said rear handle, generally transversely of said longitudinal median plane of said guide bar means,
    the other of said leg portions being spaced generally above said one leg portion and parallel thereto, and said generally upright connecting portion interconnecting said one and other parallel leg portions;
  said U-shaped hand grip means
    extending transversely across said longitudinal median plane of said guide bar means,
    being located generally above said vibration generating assembly, and
    defining a front hand grip portion disposed above and directly forward of said rear hand group portion; and
  vibration isolating means interconnecting said U-shaped hand grip means and said vibration generating assembly.

7. In a chain saw comprising
a vibration generating assembly including
  engine means,
    guide bar means extending generally longitudinally from one side portion of said chain saw and having a longitudinal median plane,
    cutter chain means mounted on the periphery of said guide bar means for movement thereabout, and,
    drive means operable to drivingly couple said engine means to said cutter chain means; and
a suspension system operable to support said vibration generating assembly and including
  a handle assembly including
    a front handle, and
    a rear handle having a rear hand grip portion;
the improvement in said suspension system comprising:
  U-shaped hand grip means extending transversely of said longitudinal median plane of said guide bar means and having a pair of leg portions extending above said engine means,
    one of said leg portions extending from a forward end of said rear handle, generally transversely of said longitudinal median plane of said guide bar means,
    the other of said leg portions being spaced generally above said one leg portion, and
    a generally upright connecting portion interconnecting said one and other leg portions;
  said U-shaped hand grip means
    extending transversely across said longitudinal median plane of said guide bar means,
    being located generally above said vibration generating assembly, and
    defining a front hand grip portion disposed above and directly forward of said rear hand group portion; and
  vibration isolating means interconnecting said U-shaped hand grip means and said vibration generating assembly,
  said rear handle including
    rear handle end means facing said front handle;
  said front handle including
    front handle end means facing said rear handle end means;
  said handle assembly including recess means carried by at least one of said front and rear handle end means and housing a first, resilient diaphragm means;
  said front and rear end means being mutually abutting and cooperating with said recess means to define said mounting means operable to house said vibration isolating means; and
  said vibration isolating means, interconnecting said U-shaped hand grip means and said vibration generating assembly being mounted at least partially within said mounting means;
  said mounting means being at least partially included in said one of said leg portions of said U-shaped hand grip means.

* * * * *